W. Wellington,
Clothes Pin.
No. 100,345.      Patented Mar. 1, 1870.
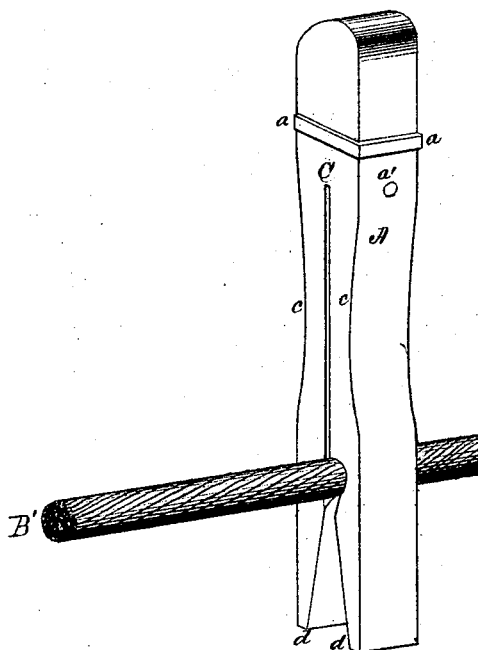
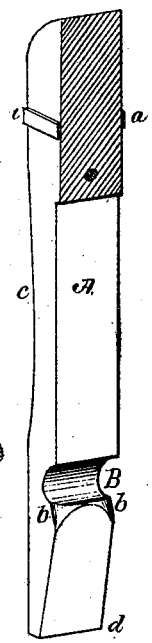
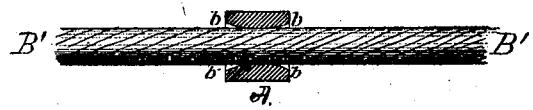
Witnesses:
Henry N. Myggatt
Charles C. Wilson
Inventor:
William Wellington
By N. Crawford
his attorney

United States Patent Office.

WILLIAM WELLINGTON, OF ROCKFORD, ILLINOIS.

Letters Patent No. 100,345, dated March 1, 1870.

IMPROVED CLOTHES-PIN.

The Schedule referred to in these Letters Patent and making part of the same.

*To whom it may concern:*

Be it known that I, WILLIAM WELLINGTON, of Rockford, in the county of Winnebago, in the State of Illinois, have invented certain new and useful Improvements in Clothes-Pins, of which the following is a specification.

The object of this invention is to produce a better clothes-pin than has heretofore been in use, by making the same more substantial and properly secured from splitting, as has been the case, and is still a fault in the pins that have been made from a solid piece of wood; and It consists in the construction of the pin as a whole, as well as special construction for special purposes.

In the drawings—

Figure 1 represents the pin in perspective as in use;

Figure 2 is an inside perspective of one-half of the pin; and

Figure 3 is a cross-section through the hole where the line is held.

Pins for fastening clothes while drying upon a line are made in various forms—some from a single piece of wood, and others from two or more pieces. Those that are made from a single piece are regarded as cheapest, but, as generally constructed, by turning them in a lathe, and slitting and chamfering with a saw, are liable to split from the slit to the knob or head, and become useless, unless they are prevented from splitting by the use of bands or rivets.

A represents a clothes-pin made from a single piece of wood, and having the hole B, which receives the line B' when in place in use.

C is a slit made from the end of the pin, in the usual way, to a proper point near to the other end, leaving space enough to prevent splitting.

Between the termination of slit C and the end or head of the pin is a metal band, $a$, that surrounds the pin, and will prevent the pin from being split. This band is made from thin sheet metal of any kind that will not oxidize by contact with the atmosphere or water.

A rivet, $a'$, may be used to prevent splitting, but I prefer the band, as that embraces the entire wood of the pin, and holds it together firmly.

From the lower side of hole B, the two sides are beveled to points $d\ d$, as seen in figs. 1 and 2, and so that the space between $d$ and $d$ of the two parts will be sufficient to receive the line and the clothes upon the line; and, as the pin is pressed down onto the line, the two parts will open, and allow the line B' to pass into hole B, where it is stopped from going further by the elasticity of the two sides, which causes them to spring together, and grasp the line B' in the hole B.

The two sides are hollowed out or made concave, as seen at $c\ c\ c$, figs. 1 and 2, and give the proper spring to the two parts of the pin to grasp and hold the line and clothes upon the line with force enough as that they will not easily be detached therefrom.

In all the clothes-pins with which I am acquainted, and in which there is a hole to receive and retain the clothes-line, no provision has been made by which such pins can be readily and easily taken from the line, as it requires that the two parts that grasp the line should be separated sufficiently for the line to pass out of the hole, and allow the pin to be lifted from the line, while in my invention, with the construction therein shown, the pin is easily detached from the line by one hand alone, which is accomplished by reason of the chamfering the insides of the two sides of the pin on the under side of hole B, as seen at $b\ b$ in figs. 2 and 3, so that, by taking hold of the pin in the usual way, with one hand, and turning the pin either to the right or left, the upper side of the line B' strikes against the upper side of hole B in the pin, and, acting as a fulcrum, forces the line into the chamfered opening on the outside of the pin under the line, and, as that chamfer runs out at the center of the width of the pin, and the line has by this means been forced to that center and opened, the two parts and the pin can then be readily lifted from the line, thus making the operation of detaching the pin from the line easy and sure.

I am aware of patent No. 77,540, granted on the 5th day of May, 1868. The invention therein described I do not claim, as the pin there described is made of two pieces of wood and riveted together or held by a band, and there is no means of stopping the pin from going too far down on the line and clothes, being liable, in very windy weather, to be forced off of the line by the violent swinging of the clothes back and forth, or of forcing the end of the pin through the clothes, while in mine the line cannot slip beyond the hole in the pin, and hence cannot project much below the line, completely obviating the difficulties above cited. Neither do I claim for a band or rivet to prevent the pin from splitting; but having fully described my invention,

What I claim as new, and desire to secure by Letters Patent, is—

1. In a clothes-pin, the chamfering the two parts below the hole B at $b\ b$, in the manner and for the purpose substantially as described.

2. As a new article of manufacture, the clothes-pin hereinabove described, and having hole B, slit C, band $a$, or rivet $a'$, and chamfers $b\ b$ therein, as set forth.

WILLIAM WELLINGTON.

Witnesses:
J. G. MANLOVE,
GEO. C. BALL.